United States Patent
Ng et al.

(10) Patent No.: US 6,737,995 B2
(45) Date of Patent: May 18, 2004

(54) CLOCK AND DATA RECOVERY WITH A FEEDBACK LOOP TO ADJUST THE SLICE LEVEL OF AN INPUT SAMPLING CIRCUIT

(76) Inventors: Devin Kenji Ng, 29 Van Liew Ave., Milltown, NJ (US) 08850; John Michael Khoury, Jr., 51 Sentinel Dr., Basking Ridge, NJ (US) 07920; Guoqing Miao, 20 Stacey Ct., Millington, NJ (US) 07946; Juergen Pianka, 4866 Loch Lomond Dr., Bloomfield Hills, MI (US) 48301

( * ) Notice: Subject to any disclaimer, the term of this patent is extended or adjusted under 35 U.S.C. 154(b) by 8 days.

(21) Appl. No.: 10/119,545

(22) Filed: Apr. 10, 2002

(65) Prior Publication Data

US 2003/0193423 A1 Oct. 16, 2003

(51) Int. Cl.[7] .................................................. H03M 5/06
(52) U.S. Cl. .................. 341/68; 375/317; 375/374; 375/375; 375/376
(58) Field of Search ................... 341/68, 144, 145, 341/122; 375/317, 355, 359, 360, 371–376

(56) References Cited

U.S. PATENT DOCUMENTS

| 5,459,679 | A | | 10/1995 | Ziperovich |
| 5,687,203 | A | * | 11/1997 | Baba .......................... 375/376 |
| 5,825,834 | A | | 10/1998 | Chambers et al. |
| 5,987,085 | A | * | 11/1999 | Anderson .................... 375/374 |
| 6,038,266 | A | * | 3/2000 | Lee et al. .................... 375/317 |
| 6,075,825 | A | | 6/2000 | Mizuhara |
| 6,121,804 | A | | 9/2000 | Bryan et al. |
| 6,259,755 | B1 | * | 7/2001 | O'Sullivan et al. ......... 375/376 |
| 6,332,205 | B1 | | 12/2001 | Conway |
| 6,396,788 | B1 | * | 5/2002 | Feyh et al. ............... 369/59.22 |
| 2001/0033407 | A1 | * | 10/2001 | Cao ........................... 359/158 |

* cited by examiner

Primary Examiner—Brian Young
Assistant Examiner—John Nguyen
(74) Attorney, Agent, or Firm—Fish & Richardson P.C.

(57) ABSTRACT

Techniques that may aid in the recovery of clock and data signals include receiving a stream of incoming data signals and determining an offset based, at least in part, on the state of a transition bit sampled from the stream of incoming data signals. The slice level of an input sampling circuit is adjusted based on the offset. Re-timed data signals corresponding to the incoming data signals may be generated.

47 Claims, 7 Drawing Sheets

| A | T | B | CLOCK CONTROL | SLICE LEVEL CONTROL |
|---|---|---|---|---|
| 0 | 0 | 0 | | DECREASE IF THERE ARE A PREDETERMINED NUMBER OF OCCURRENCES OF [0, 0, 0] |
| 0 | 0 | 1 | RETARD | DECREASE |
| 0 | 1 | 0 | ADVANCE | INCREASE |
| 0 | 1 | 1 | ADVANCE | DECREASE |
| 1 | 0 | 0 | | |
| 1 | 0 | 1 | | |
| 1 | 1 | 0 | RETARD | INCREASE |
| 1 | 1 | 1 | | INCREASE IF THERE ARE A PREDETERMINED NUMBER OF OCCURRENCES OF [1, 1, 1] |

CLOCK AND DATA RECOVERY WITH A FEEDBACK LOOP TO ADJUST THE SLICE LEVEL OF AN INPUT SAMPLING CIRCUIT

BACKGROUND

This disclosure relates to clock and data recovery techniques.

Receivers in communications systems may perform various functions including receiving data signals and recovering timing signals from the received data signals. In some communications systems, the incoming data signals are transmitted using a non-return to zero (NRZ) format. A nonlinear circuit may be used to detect timing information and to recover the clock signal from the NRZ format data stream.

Direct current (DC) offsets may be introduced into the data recovery process as a result of analog processing circuitry such as amplifiers, filters and flip-flops. The DC offset associated with such circuitry may result in a signal level shift which, if left uncorrected, can degrade performance of the data recovery system.

SUMMARY

In general, techniques are disclosed that may aid in the recovery of clock and data signals.

In one implementation, an apparatus includes an input to receive a stream of incoming data signals. A timing acquisition circuit including a sampling circuit to sample the incoming data signals. The timing acquisition circuit extracts clock information from the incoming data signals and provides re-timed signals corresponding to the incoming data signals based on the extracted clock information. A feedback loop coupled between an output of the timing acquisition circuit and the input adjusts a slice level of the sampling circuit based on a transition bit sampled from the stream.

According to one aspect, a method includes receiving a stream of incoming data signals and determining an offset based, at least in part, on the state of a transition bit sampled from the stream of incoming data signals. The slice level of an input sampling circuit is adjusted based on the offset. The method includes generating re-timed data signals corresponding to the incoming data signals.

According to another aspect, a method includes receiving a stream of incoming data signals and generating re-timed data bits corresponding to the incoming data signals. An offset cancellation signal is provided to cancel amplitude offset from signals in the stream. The method includes adjusting the offset cancellation signal based on a state of a transition bit occurring between re-timed data bits.

In various implementations, one or more of the following features may be present. Determining an offset may include examining a pair of consecutive data bits and an intervening transition bit. A signal corresponding to a detected offset may be provided based on the examined data bits and transition bit. The techniques may include repeatedly examining subsequent groups of consecutive data bits and an intervening transition bit and providing signals indicative of the detected offsets. In some cases, the techniques include averaging or integrating the signals corresponding to the detected offsets.

The techniques may be applied to a stream of incoming data signals in a non-return to zero format, as well as to data streams in other formats.

In some implementations, the timing acquisition circuit may include a phase detector. The apparatus may include a phase locked loop circuit that may include the phase detector. The timing acquisition circuit may be configured to sample data and transition bits from the incoming stream based on a timing signal from the phase locked loop.

The circuitry to adjust the slice level may be implemented in various ways. For example, the circuitry may include a charge pump, as well as a loop filter coupled to an output of the charge pump. Alternatively, the circuitry may include a continuous-time low-pass filter. In other implementations, the circuitry may include a digital low-pass filter, as well as a digital-to-analog converter coupled to an output of the low-pass filter.

The circuitry to adjust the slice level may be configured to provide signals indicative of how to adjust the slice level based on respective states of transition bits occurring between pairs of re-timed data bits. In some implementations, the circuitry includes a counter to integrate the signals indicative of how to adjust the slice level. The counters may generate a signal indicating that the slice level should be adjusted, for example, if one of the counters reaches a predetermined count. The circuitry also may be configured to keep track of the number of times that data bits and an intervening transition bit have the same value and to adjust the slice level if the data and transition bits have the same value consecutively for a predetermined number of times.

Various implementations may include one or more of the following advantages. The same circuit may be used to perform the timing recovery process and offset measurement, thereby reducing the overall number of components required. The techniques may reduce or eliminate residual sources of DC offset, including offset from front-end circuitry as well as offset from the phase detector and sampling flip-flops. Furthermore, the techniques need not be constrained by the assumption inherent in some clock and data recovery systems that the density of logical "1"s and "0"s in the pattern of data bits in the data stream is substantially equal. The techniques may provide increased sensitivity of detection and reduced jitter in the timing recovery process.

Other features and advantages will be readily apparent from the following detailed description, the accompanying drawings and the claims.

DETAILED DESCRIPTION

Figure 1:
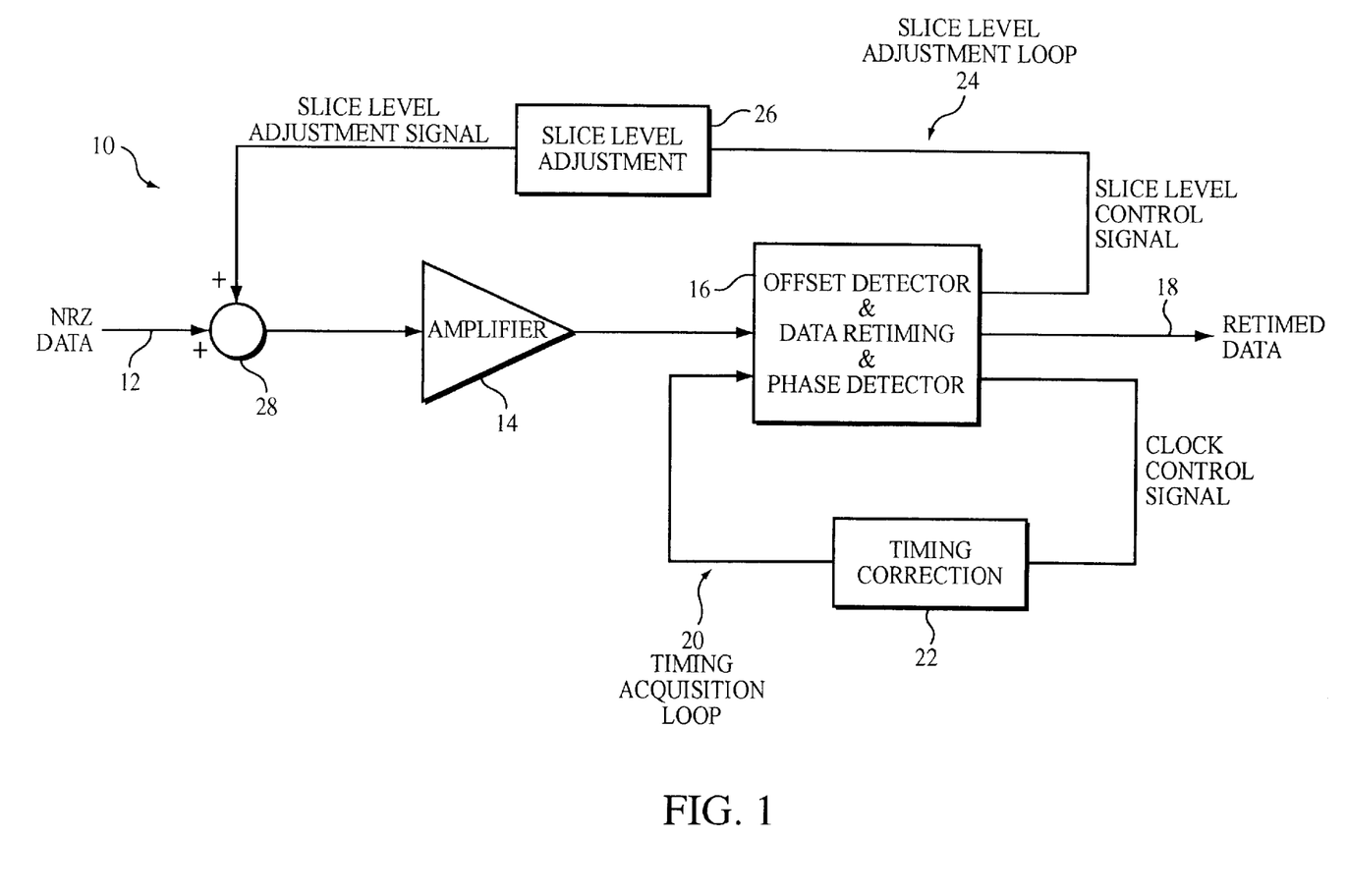
FIG. 1 is a block diagram of a receiver with a clock and data recovery circuit according to one implementation.

Referring to FIG. 1, a communications receiver 10 may receive a stream of data signals in a NRZ or other format from a signal path 12, such as an optical fiber. The data signals are passed through a summer 28 and amplified by amplifier 14 before they are provided to circuitry 16. The circuitry 16 performs several functions including phase detection, offset detection and data retiming. The re-timed data signals are provided to output line 18.

Figure 4:
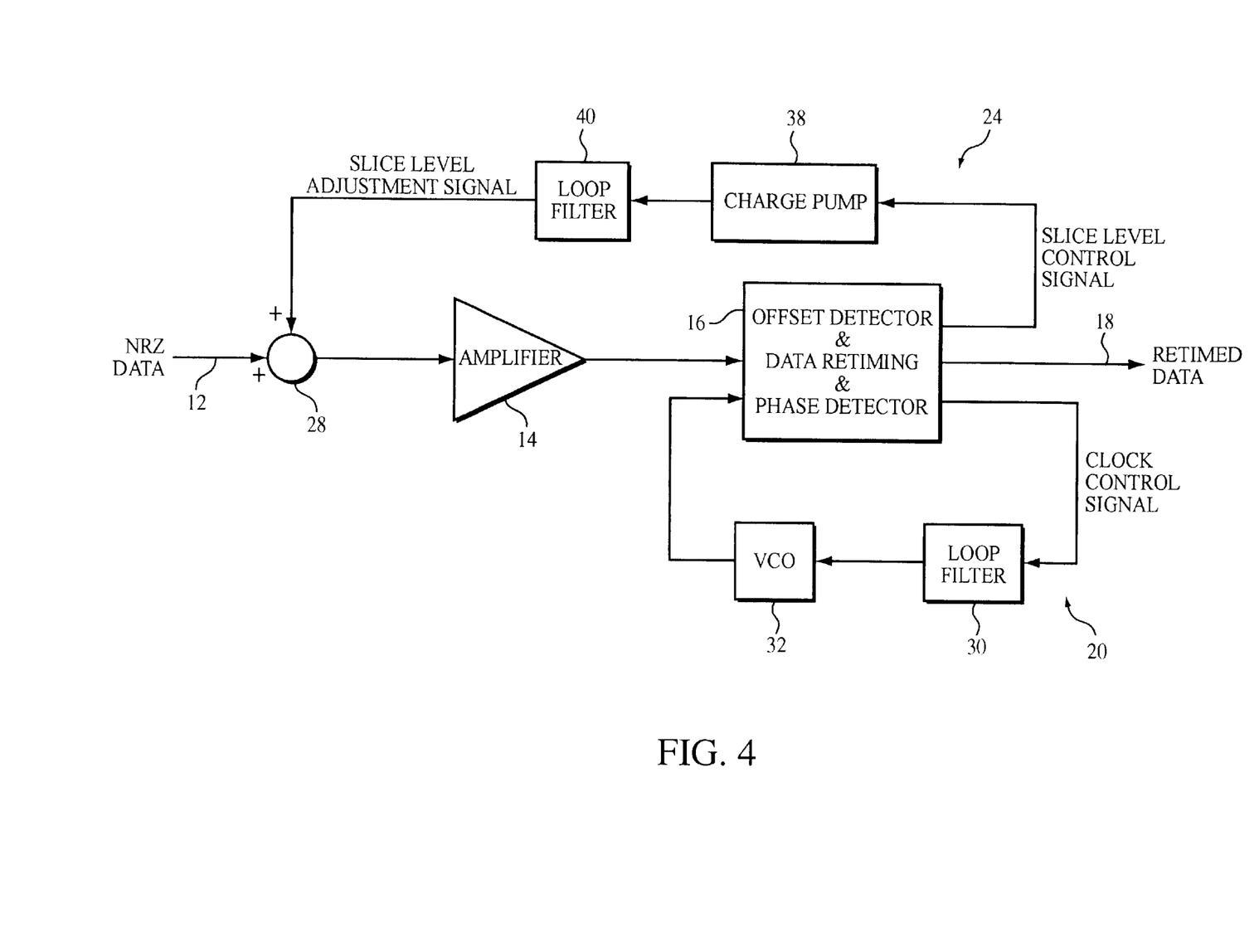
FIG. 4 is a block diagram of a clock and data recovery circuit including analog circuitry to adjust the slice level of the input sampling circuit.
Figure 5:
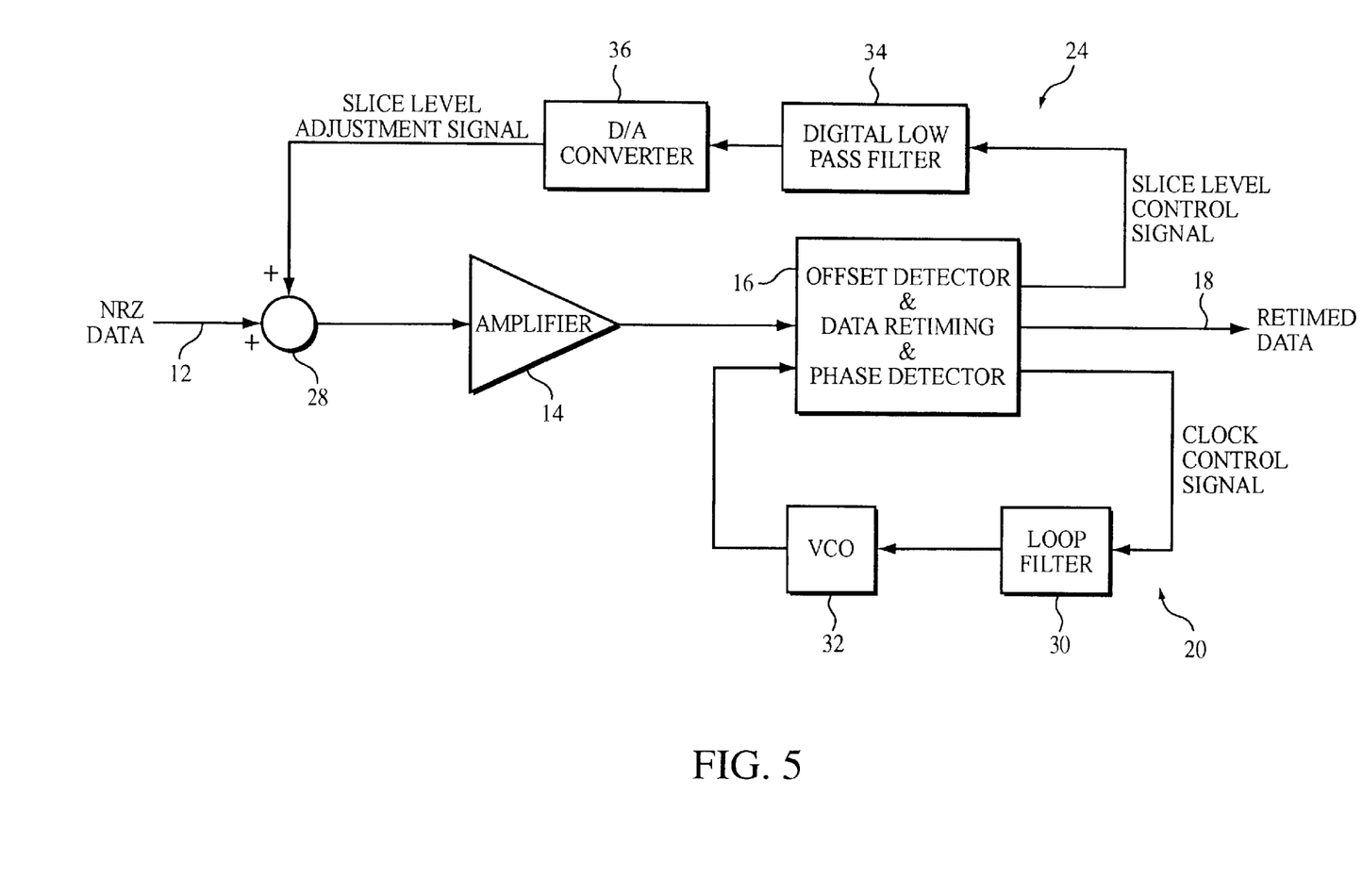
FIG. 5 is a block diagram of a clock and data recovery circuit including digital circuitry to adjust the slice level of the input sampling circuit.

The receiver 10 includes a timing acquisition loop 20 to extract clock information from the incoming data signals. The timing acquisition loop 20 includes the phase detection circuitry 16 and timing correction circuitry 22. As shown in FIGS. 4 and 5, the timing correction circuitry may include a loop filter 30 to perform timing averaging and a voltage controlled oscillator (VCO) 32 to implement corresponding phase changes. The combination of the phase detection circuitry, the loop filter and the VCO may operate as a phase locked loop (PLL) circuit. A signal from the VCO is used to trigger flip-flops (not shown in FIG. 1) in the circuitry 16 to latch the incoming data signals and to pass the re-timed data signals to the output line 18.

The receiver also includes a loop 24 to adjust the slice level at which the incoming data signals are sampled. The slice level adjustment loop 24 includes the offset detector circuitry and circuitry 26 to adjust the slice level. The slice level adjustment circuitry 26 may be implemented using digital or analog components. In either case, the circuitry 26 may provide an output signal to the summer 28, which adds a signal to adjust the slice level of the input sampling circuit.

Figure 2A:
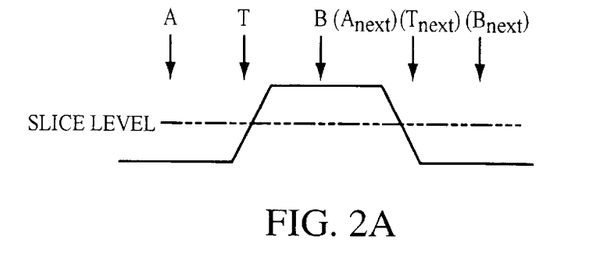
FIGS. 2A and 2B illustrate sampling of data and transition bits.

The circuitry 16 is configured to sample data during each data bit period and to sample the signal in the transition period between each pair of consecutive data periods. Referring, for example, to FIG. 2A, the circuitry 16 would sample the incoming data signal during a first period representing a first data bit period A and during a second period representing the next data bit period B. The circuitry 16 also samples a signal in the transition period T that occurs between the two consecutive data bit periods A and B. The circuitry 16 continues to sample signals in subsequent data periods and transition periods. In the illustrated implementation, the circuitry 16 detects each sampled signal as either a logical "0" or a logical "1."

Assuming that the timing circuitry is locked to the incoming data signals and that the incoming data signals and the input amplifier 14 are offset free, then the transition bit T would be re-timed approximately fifty percent of the time as a logical "0" and approximately fifty percent of the time as a logical "1." Ideally, the circuitry 16 would sample the transition bit at the moment when it is as likely that a logical "0" will occur as it is that a logical "1" will occur. The actual sampling time, however, may vary depending on a combination of timing jitter, rise and fall times of the incoming data signals, and noise distributions of the incoming data signals.

Figure 2B:
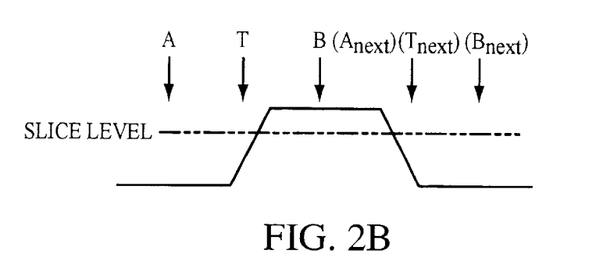

If, for example, offset is present as shown in FIG. 2B, the sample taken during the transition period T will no longer be re-timed fifty percent of the time as a logical "0" and fifty percent of the time as a logical "1." The slice level adjustment loop 24 can help reduce or eliminate offset that may be present in the incoming data signals.

Figure 3A:
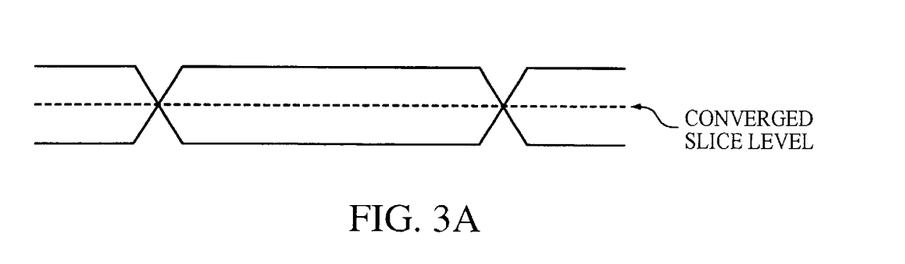
FIGS. 3A and 3B illustrate the effect of the relative values of rise and fall times of the incoming data stream.
Figure 3B:
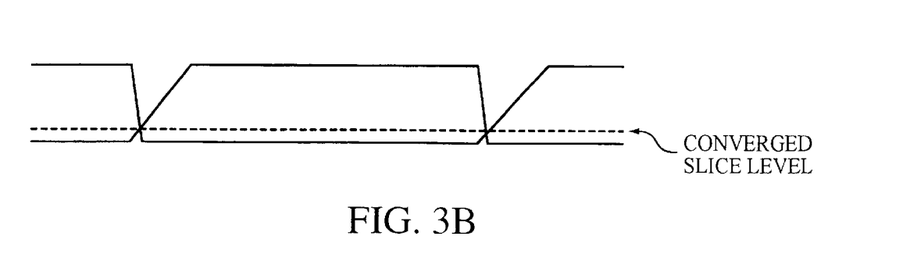

FIGS. 3A and 3B illustrate the effect of asymmetrical rise and fall times of the incoming data signals. The slice level adjustment loop 24 causes the slice level to converge to a level where the probability of detecting a logical "1" for the transition bit is substantially equal to the probability of detecting a logical "0" for the transition bit. Even if the rise and fall times are not the same, the loop 24 can help reduce jitter.

The circuitry 16 is configured to examine combinations of three sampled signals corresponding, respectively, to two consecutive data bit periods (A and B) and the intervening transition bit period (T). Referring to FIG. 2B, one group of three sampled signals corresponds to the periods designated A, T and B. A second group of sampled signals corresponds to the periods designated $A_{next}$, $T_{next}$ and $B_{next}$. In the illustrated example, the periods B and $A_{next}$ designate the same data bit period. As explained in greater detail below, the circuitry 16 generates a first signal ("clock control") to control the timing correction circuitry 22 and a second signal ("slice level control") to control the circuitry 26 based on the values of the sampled signals.

Figure 6:
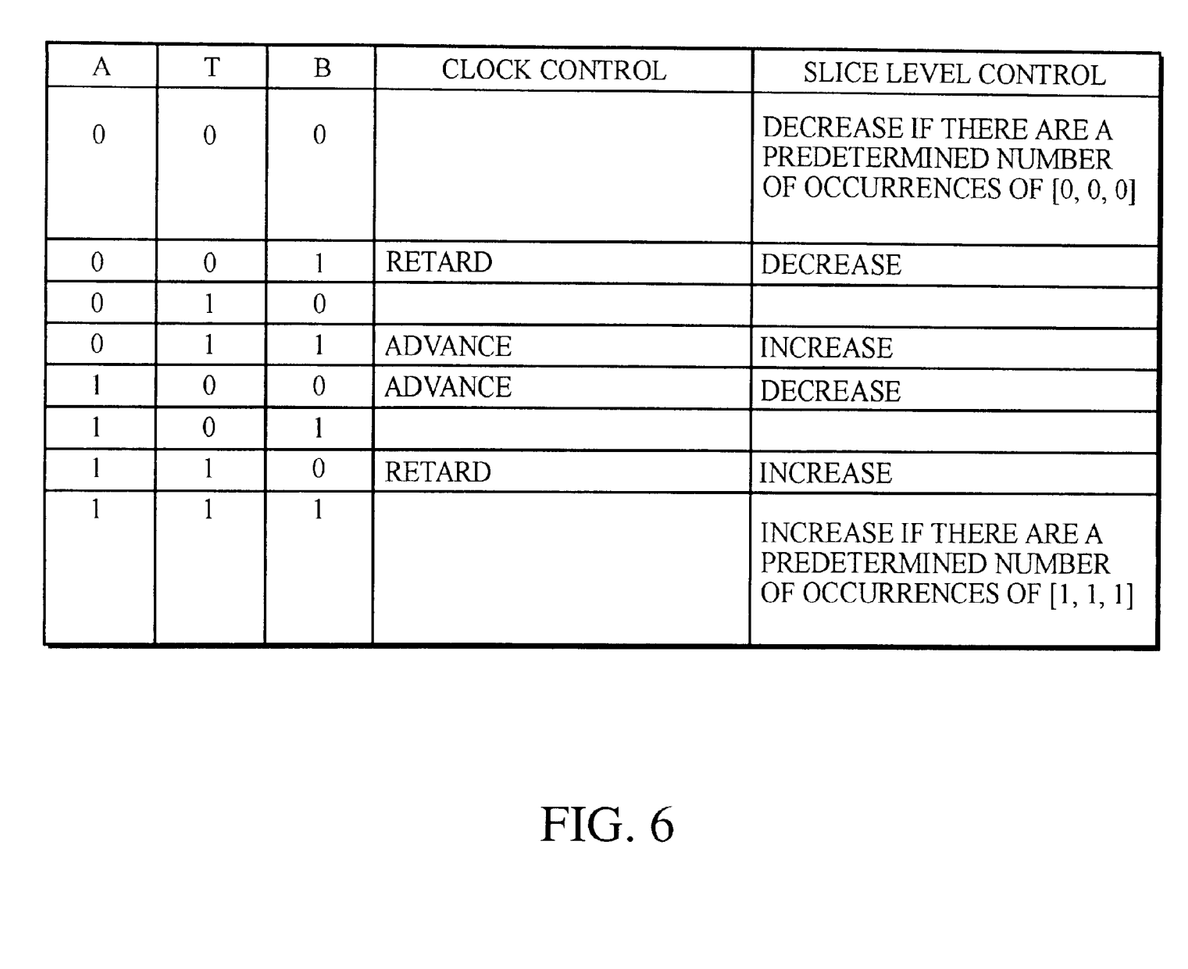
FIG. 6 is a table indicating what signals to generate to control timing correction and slice level adjustment based on the sampled data and transition bits.

The first three columns in the table of FIG. 6 identify the possible combinations of logical values [A, T, B] for signals sampled, respectively, during the three periods A, T and B. The circuitry 16 decodes the values of the sampled signals [A, T, B] and generates the clock control signal for the timing correction circuitry 22. The information in the fourth column of the table in FIG. 6 identifies the action indicated by the clock control signal.

For example, if the values for [A, T, B] are [0, 0, 1] or [1, 1, 0], then the transition bit is being sampled too early. In that case, the clock control signal is used to retard the clock signal that triggers the circuitry 16 to output the re-timed data signals. On the other hand, if the values for [A, T, B] are [1, 0, 0] or [0, 1, 1], then the transition bit is being sampled too late, and the clock control signal is used to advance the clock signal that triggers the circuitry 16 to output the re-timed data signals. If the values for [A, T, B] are [0, 0, 0] or [1, 1, 1], then no change is made to the clock control signal.

Typically, the value of the sample taken during a transition period T is expected to be the same as the value of at least one of the samples taken during the data periods A and B. In situations where that is not the case, such as when the values of [A, T, B] are [1, 0, 1] or [0, 1, 0], it is assumed that an error occurred, and no change is made to the clock control signal.

The signal sampled during the transition bit period (T) may serve as a measure of the offset present in the incoming data stream. The state of the transition bit during a transition from a logical "1" to a logical "0" or vice-versa serves as the basis for either incrementing or decrementing the slice level adjustment signal provided to the summer 28. The offset may be measured based on the three signals sampled, respectively, during two consecutive data bit periods (A and B) and the intervening transition bit period (T). The circuitry 16 generates a slice level control signal based on the decoded values of the sampled signals [A, T, B]. The fifth column in the table of FIG. 6 identifies the action indicated by the slice level control signal.

For example, if the values for [A, T, B] are [0, 0, 1] or [1, 0, 0], then the slice level for sampling the transition bit is assumed to be too high. In that case, the slice level control signal is used to increase the signal fed back to the summer 28 from the circuitry 26. On the other hand, if the values for [A, T, B] are [1, 1, 0] or [0, 1, 1], then the slice level for sampling the transition bit is assumed to be too low. In that case, the slice level control signal is used to decrease the signal fed back to the summer 28.

During operation, the phase detector circuitry 16 samples subsequent groups of signals. Repeated, consecutive values of [0, 0, 0] for the sampled signals [A, T, B] may indicate that the DC offset is larger than the incoming data signals. Therefore, if values of the sampled signals [A, T, B] are detected consecutively as [0, 0, 0] a predetermined number of times, the circuitry 16 generates a slice level control signal to decrease the signal fed back to the summer 28 from the circuitry 26. Similarly, repeated, consecutive values of [1, 1, 1] for the sampled signals [A, T, B] may indicate that the DC offset is larger than the incoming data signals. Therefore, if values of the sampled signals [A, T, B] are consecutively [1, 1, 1] for a predetermined number of times, the circuitry 16 generates a slice level control signal to increase the signal fed back to the summer 28.

As previously explained, the value of the sample taken during a transition period T should be the same as the value of at least one of the samples taken during the data periods A, B. In situations where that is not the case, such as when the values of [A, T, B] are [1, 0, 1] or [0, 1, 0], it is assumed that an error occurred, and the circuitry 16 does not generate a slice level control signal to decrease or increase the signal fed back to the summer 28.

In one embodiment, if the decoded value of the [A, T, B] bits indicates that the slice level adjustment signal should be increased, the circuitry 26 increases the slice level adjustment signal by a predetermined amount. Conversely, if the decoded value of the [A, T, B] bits indicates that the slice level adjustment signal should be decreased, the circuitry 26 decreases the slice level adjustment signal by a predetermined amount.

In other implementations, the decision regarding how to adjust the slice level adjustment signal fed back to the summer 28 is based on averaging multiple measurements of the offset obtained using the techniques discussed above. As explained above, each offset measurement depends on the value of a signal sampled during a transition period that occurs between two consecutive data bit periods. The circuitry 26 would then average the offsets that were detected during a particular time period and apply a slice level adjustment signal to the summer 28 based on the averaged value.

For example, as illustrated in the implementation of FIG. 4, the slice level adjustment circuitry may include a charge pump 38. An output of the charge pump 38 is coupled to an input of a loop filter 40, which may include, for example, a capacitor. The increment and decrement signals corresponding to the [A, T, B] bits drive the charge pump. The states of the T bits detected during transition periods are integrated by the loop filter capacitor. In another analog implementation, the circuitry 236 may include a sampled data or continuous-time low-pass filter.

Alternatively, as illustrated in the digital implementation of FIG. 5, the slice level adjustment circuitry 26 may include a digital low pass filter 34 having an output coupled to the input of a digital-to-analog converter 36 (DAC). The filter 34 averages the detected offsets, and the DAC 36 converts the averaged value to a corresponding analog signal.

Figure 7:
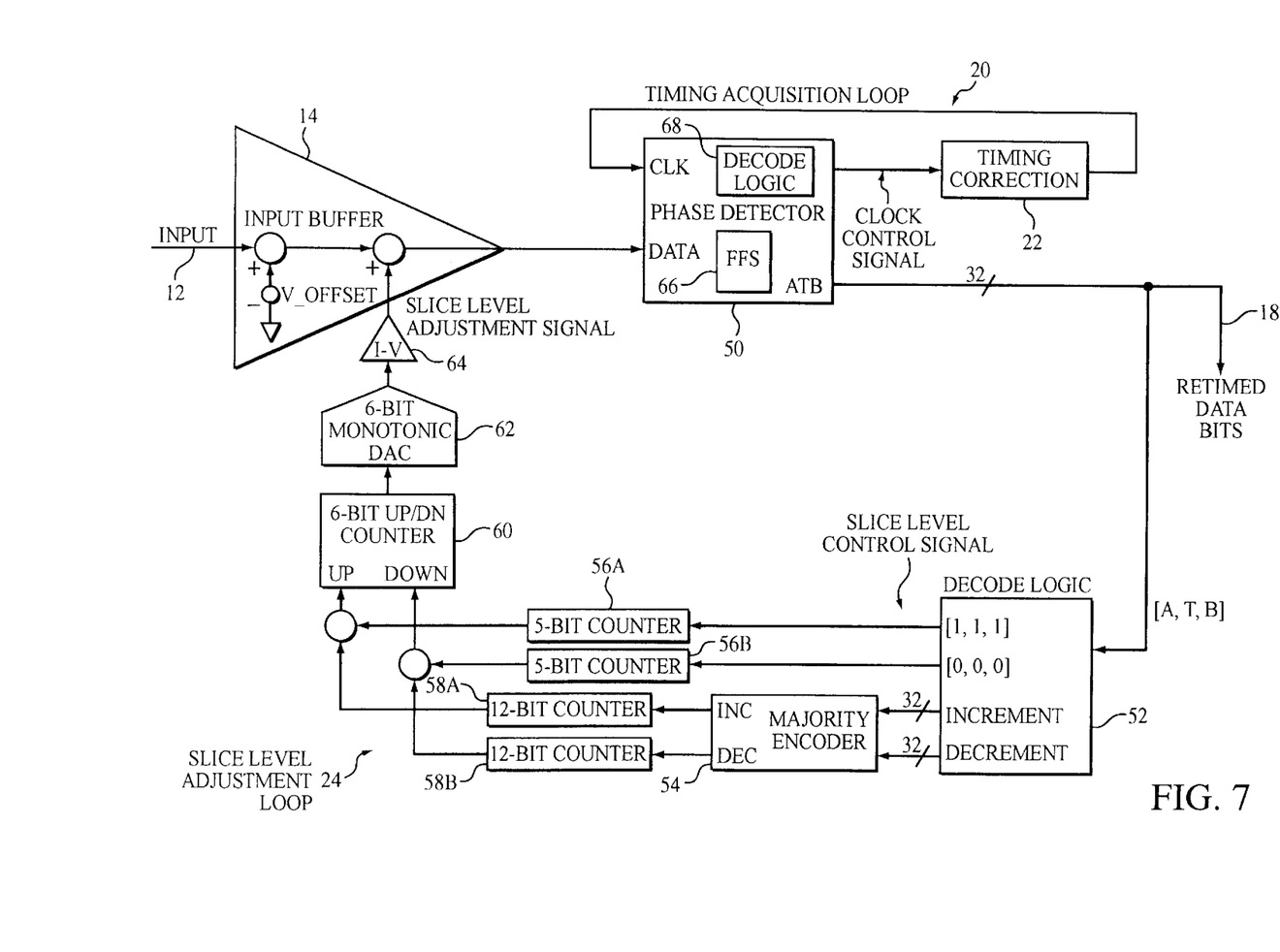
FIG. 7 is a block diagram showing details of a clock and data recovery circuit according to one implementation.

FIG. 7 illustrates details of one particular implementation for a slice level adjustment loop that incorporates a technique for averaging the detected offsets. In FIG. 7, the amplified data signals are provided to a phase detector 50 that may be implemented, for example, using an Alexander phase detector. Logic 68 for decoding the [A, T, B] sampled signals to provide the clock control signal according to the table of FIG. 6 may reside in the phase detector 50. A signal provided from the timing correction circuitry 22 to a CLK input of the phase detector 50 serves to trigger flip-flops (FFs) 66 that latch the incoming data signals and provide the re-timed data bits [A, B] as well as the transition bit [T] as output. In the illustrated implementation, thirty-two groups of sampled signals [A, T, B] may be provided simultaneously from the phase detector to logic 52. The re-timed data bits [A, B] are passed to the output line 18.

The logic 52, which may include logic gates, decodes each group of sampled signals [A, T, B] to provide slice level control signals according to the table of FIG. 6. If a group of thirty-two sampled signals [A, T, B] corresponds to logic values [1, 1, 1], then the decode logic 52 provides a signal to a five-bit counter 56A. Similarly, if a group of thirty-two sampled signals [A, T, B] corresponds to logic values [0, 0, 0], then the decode logic 52 provides a signal to another five-bit counter 56B. Should either of the five-bit counters 56A, 56B overflow, the counter that overflowed provides a signal to a six-bit up-down counter 60. Specifically, if the five-bit counter 56A overflows, it provides a signal that instructs the counter 60 to increment its count by one. If the five-bit counter 56B overflows, it provides a signal that instructs the counter 60 to decrement its count by one.

If a group of sampled signals [A, T, B] corresponds either to logic values [0, 1, 1] or [1, 1, 0], the decode logic 52 provides an increment signal to a majority encoder 54. Similarly, if a group of sampled signals [A, T, B] corresponds either to logic values [1, 0, 0] or [0, 0, 1], the decode logic 52 provides a decrement signal to the majority encoder 54.

The majority encoder 54 determines the relative number of increment and decrement signals received from the decode logic 52. If the number of increment signals is greater, then the majority encoder 54 provides an increment signal to a twelve-bit counter 58A. Conversely, if the number of decrement signals is greater, the majority encoder 54 provides an increment signal to another twelve-bit counter 58B. If the number of increment signals from the decode logic 52 equals the number of decrement signals, then the majority encoder 54 does not provide an output signal to either of the twelve-bit counters 58A, 58B.

The twelve-bit counters 58A, 58B function as a digital integrator. Should either of the twelve-bit counters 58A, 58B overflow, the counter that overflowed provides a signal to the six-bit up-down counter 60. Specifically, if the twelve-bit counter 58A overflows, it provides a signal that instructs the counter 60 to increment its count by one. If the twelve-bit counter 58B overflows, it provides a signal that instructs the counter 60 to decrement its count by one. Using two counters 58A, 58B may avoid the need for a high-speed up/down counter and may provide some hysteresis in the slice level adjustment loop.

When any of the counters 56A, 56B or 58A, 58B overflows, that counter automatically is reset to zero. Additionally, the five-bit counter 56A is reset to zero when values other than [1, 1, 1] are detected for the [A, T, B] bits. Similarly, the five-bit counter 56B is reset to zero when values other than [0, 0, 0] are detected for the [A, T, B] bits.

The digital output from the six-bit counter 60 is provided to a six-bit monotonic digital-to-analog converter (DAC) 62. In the illustrated implementation, the DAC 62 provides an analog current signal at its output. The current signal may be converted to a voltage signal using a current-to-voltage converter 64 such as a resistor. That voltage, which corresponds to the slice level adjustment voltage, is fed to the amplifier 14. As mentioned above, in situations where the rise and fall times of signals in the data stream are about the same, DC offset associated with the data signals may be cancelled using the foregoing technique. Even where the rise and fall times are not the same, the amount of jitter may be reduced by causing the slice level to converge to the level where the probability of detecting a logical "1" for the transition bit is substantially equal to the probability of detecting a logical "0" for the transition bit.

The technique described above and illustrated in FIG. 7 represents one particular implementation. Programmable counters or counters having different sizes from those discussed above may be employed in other implementations. Furthermore, the particular way in which the output signals from the decode logic 52 are averaged or otherwise used to determine when and how to adjust the slice level adjustment voltage may be different in other implementations.

When the slice level adjustment signal serves to cancel offset from the signals in the incoming data stream, the circuitry 26 adjusts the offset cancellation signal (i.e., the slice level adjustment signal) based on the state of the transition bit occurring between a pair of re-timed data bits. In general, the circuit may operate in one of several states: (1) the DC offset may be greater than the input level of the receiver; (2) the DC offset may be less than the input level of the receiver, but the timing loop may not yet be locked; (3) the DC offset may be at the boundary of the input level with the timing loop frequency locked, but out of phase; and (4) the DC offset may be less than the input level of the receiver with the timing loop locked with respect to phase and frequency. When operating in any of those states, the outputs of the phase detector 50 may be used to measure the input offset and to adjust the slice level voltage as discussed above to cancel DC offset associated with the incoming data signals.

Under DC overload conditions—in other words, when the DC offset is greater than the receiver input level—the output of the receiver buffer remains at either a logical "0" or "1," depending on the polarity of the offset. In that situation, the clock and data recovery loop cannot extract the timing information. When a predetermined number of successive "all ones" or "all zeros" are detected by the counters 56A, 56B, the output of the DAC 62 is changed. The loop continues to operate under that condition until (1) the offset level is less than the receiver input level so that transition bits can be detected by the phase detector or (2) the DAC 62 becomes saturated. When the offset is cancelled to the point where data transitions can be detected, the slice level voltage may be controlled by averaging the transition bits through use of the majority encoder 54 and the counters 58A, 58B. If condition (2) occurs, a signal may be fed back to indicate that the DC offset is out of range for cancellation.

When the clock and data recovery loop is not yet locked, frequency and phase offset may still be present. In that case, one may consider the phase detector 50 as sampling the input data stream in a random fashion. If offset is present at the receiver input, the probability of randomly sampling a logical "1" increases in proportion to the offset. If the phase detector samples [1, 1, 0] or [0, 1, 1] from the input data stream, the slice level adjustment voltage increases, and offset present at the receiver input is reduced. When the density of transition bits detected as a logical "1" is skewed from fifty percent, the resulting offset is proportionately skewed from the midpoint of the input swing. During this mode, the clock and data recovery loop can still operate to allow the timing to lock even though there still is some offset present at the receiver input.

Once proper timing is achieved, the clock is locked with respect to the phase and frequency of the incoming data stream. When the clock is locked, the A and B bits from the phase detector 50 represent data samples, and the T bit represents the signal sampled during the transition period between the data bits. Offset at the receiver input translates to a corresponding increase or decrease in the probability of detecting the transition bit as a logical "1" during a valid data transition. Averaging the transition bits during valid data transitions provides a measure of the offset. As described above, the values of the transition bits may be accumulated in the counters 58A, 58B, and 60. The result is provided to the DAC 62 and converted to the slice level adjustment signal.

Figure 8:
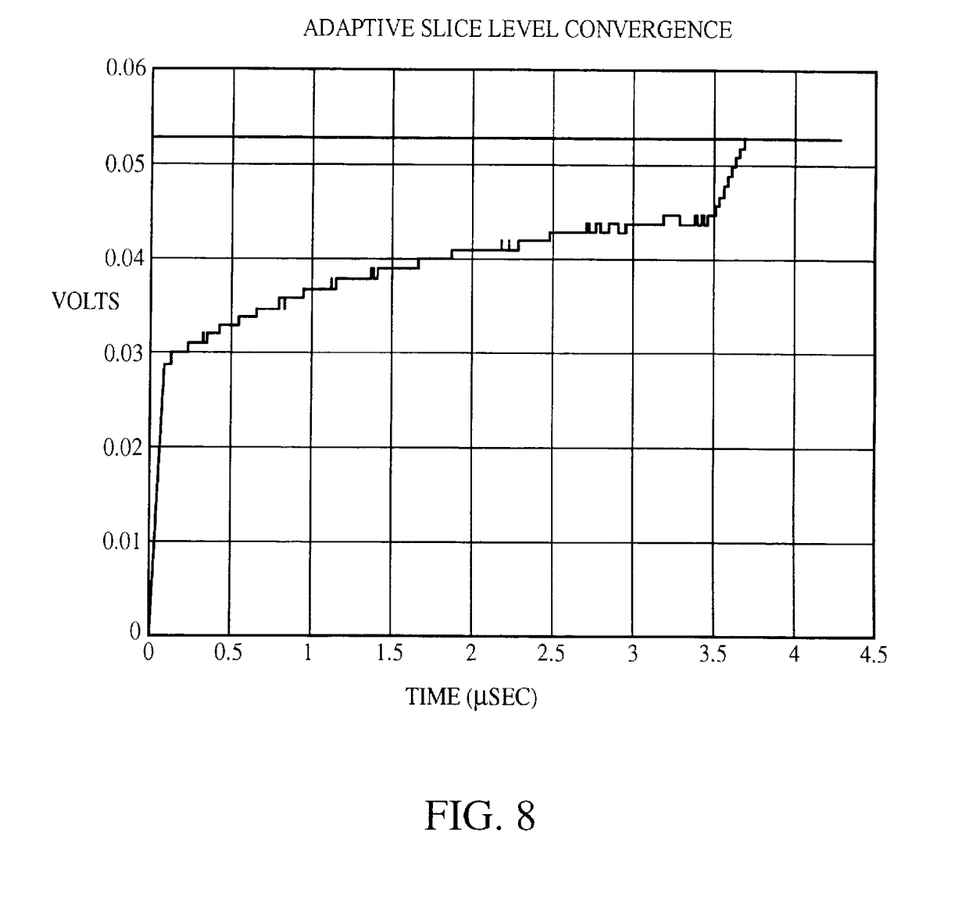
FIG. 8 is a graph illustrating a simulated example of adaptive slice level convergence.

FIG. 8 illustrates simulated data for adaptive slice level convergence under three modes of operation discussed above. The graph plots voltage versus time. During the initial one hundred nanoseconds (nsec), the system is in a DC overload mode as indicated in the graph by the steep slope of the slice level adjustment voltage. At approximately one hundred nsec, sufficient offset has been cancelled to allow the clock and data recovery loop to begin acquiring timing information. During the period when the clock and data recovery loop has not yet completed locking onto the frequency and phase of the incoming data stream, the slice level adjustment loop slowly corrects the offset based on the random sampling of the phase detector 50. At approximately 3.5 microseconds ($\mu$sec), the clock and data recovery loop locks onto the phase and frequency of the incoming data stream. The phase detector 50 then is able to sample data accurately during the A and B data bit periods and the transition bit period T. In the latter mode, the loop can correct any remaining offset relatively quickly.

Various features of the apparatus may be implemented in a software program executing on a programmable computer. Instructions for the computer programs may be stored on a storage medium, such as read-only memory (ROM) or other types of memory, that is readable by a general or special purpose processor.

Other implementations are within the scope of the claims.

What is claimed is:

1. A method comprising:
   receiving a stream of incoming data signals;
   determining an offset based, at least in part, on a state of a transition bit sampled from the stream of incoming signals;
   adjusting a slice level of an input sampling circuit based on the offset; and
   generating re-timed data signals corresponding to the incoming data signals.

2. The method of claim 1 wherein determining an offset includes examining a pair of consecutive data bits and an intervening transition bit.

3. The method of claim 1 said determining includes:
   examining consecutive data bits and an intervening transition bit; and
   providing a signal corresponding to a detected offset based on the examined data bits and transition bit.

4. The method of claim 3 including repeatedly performing said examining and said providing with respect to subsequent groups of consecutive data bits and an intervening transition bit.

5. The method of claim 4 wherein said determining includes averaging the signals corresponding to the detected offsets.

6. The method of claim 1 wherein said determining includes:
   sampling a pair of consecutive data bits in the data stream and a transition bit occurring in a transition period between the data bits; and providing a signal indicative of whether the slice level should be incremented or decremented based on the sampled bits.

7. The method of claim 6 including:

repeatedly performing said sampling and said providing with respect to different groups of data and transition bits;

accumulating signals indicative of whether the slice level should be incremented or decremented based on the sampled bits; and adjusting the slice level based on the accumulated signals.

8. The method of claim 7 wherein said accumulating includes averaging the signals indicative of whether the slice level should be incremented or decremented.

9. The method of claim 1 wherein receiving a stream of incoming data signals includes receiving data in a non-return to zero format.

10. A method comprising:

receiving a stream of incoming data signals;

generating re-timed data bits corresponding to the incoming data signals;

providing an offset cancellation signal to cancel amplitude offset from signals in the stream; and adjusting a magnitude of the offset cancellation signal based on a state of a transition bit occurring between re-timed data bits.

11. The method of claim 10 including determining whether to increment or decrement the offset cancellation signal based on the state of the transition bit relative to states of re-timed data bits occurring before and after the transition bit.

12. The method of claim 10 including:

detecting a state of a transition bit occurring between consecutive re-timed data bits having different logical values;

repeatedly performing said detecting for subsequent transition bits; and averaging the detected states of the transition bits, determining whether to increment or decrement the offset cancellation signal based on said averaging.

13. A method comprising:

sampling a pair of consecutive data bits and an intervening transition bit from a stream of incoming data signals using an input sampling circuit;

determining whether a slice level of the input sampling circuit should be incremented or decremented based on the sampled bits;

repeatedly performing said sampling and said determining for other groups of data and transition bits;

adjusting the slice level based on repeated performances of said determining; and generating re-timed data signals corresponding to the incoming data stream.

14. The method of claim 13 wherein determining whether the slice level should be incremented or decremented is based on a state of the transition bit during a transition between re-timed data signals having different logical states.

15. The method of claim 13 including:

generating a signal indicative of whether the slice level should be incremented or decremented each time it is determined that the offset cancellation signal should be incremented or decremented;

averaging the signals indicative of whether the slice level should be incremented or decremented; and adjusting the slice level based on said averaging.

16. The method of claim 15 including:

keeping track of a number of times that the data bits and intervening transition bit have the same value; and generating a signal to adjust the slice level if the data and transition bits have the same value consecutively for a predetermined number of times.

17. The method of claim 15 wherein averaging the signals includes:

keeping track of whether, for a predetermined number of cycles in the data stream, the number of signals indicating that the slice level should be incremented is greater or less than the number of signals indicating that the slice level should be decremented;

incrementing a first count if it is determined that the number of signals indicating that the slice level should be incremented is greater than the number of signals indicating that the slice level should be decremented;

incrementing a second count if it is determined that the number of signals indicating that the slice level should be incremented is less than the number of signals indicating that the slice level should be decremented;

incrementing the slice level if the first count exceeds a first predetermined number; and decrementing the slice level if the second count exceeds a second predetermined number.

18. An apparatus comprising:

an input to receive a stream of incoming data signals;

a timing acquisition circuit including a sampling circuit to sample the incoming data signals, said timing acquisition circuit to extract clock information from the incoming data signals and to provide re-timed signals corresponding to the incoming data signals based on the extracted clock information; and circuitry coupled between an output of the timing acquisition circuit and said input to adjust a slice level of the sampling circuit based on a transition bit sampled from the stream.

19. The apparatus of claim 18 wherein said circuitry is configured to generate a slice level adjustment signal based on transition bits occurring between re-timed data bits in the re-timed signals, said circuitry having an output coupled to said input to adjust the slice level of the sampling circuit based on the slice level adjustment signal.

20. The apparatus of claim 18 wherein said circuitry includes a digital low-pass filter.

21. The apparatus of claim 20 wherein said circuitry includes a digital-to-analog converter coupled to an output of the low-pass filter.

22. The apparatus of claim 18 wherein said circuitry is configured to provide signals indicative of how to adjust the slice level based on the respective states of transition bits occurring between respective pairs of consecutive re-timed data bits.

23. The apparatus of claim 22 wherein said circuitry includes a counter to integrate the signals indicative of how to adjust the slice level.

24. The apparatus of claim 23 wherein the counters generate a signal indicating that the slice level should be adjusted if one of the counters reaches a predetermined count.

25. The apparatus of claim 22 wherein said circuitry is configured to:

keep track of a number of times that data bits and an intervening transition bit have the same value; and generate a signal to adjust the slice level if the data and transition bits have the same value consecutively for a predetermined number of times.

26. The apparatus of claim 18 wherein said circuitry includes a charge pump.

27. The apparatus of claim 26 wherein said circuitry includes a loop filter coupled to an output of the charge pump.

28. The apparatus of claim 18 wherein said circuitry includes a continuous-time low-pass filter.

29. The apparatus of claim 18 wherein said circuitry includes a sampled data filter.

30. The apparatus of claim 18 wherein the timing acquisition circuit includes a phase detector.

31. The apparatus of claim 30 comprising a phase locked loop circuit, the phase locked loop including the phase detector.

32. The apparatus of claim 31 wherein the timing acquisition circuit is configured to sample data and transition bits from the incoming stream based on a timing signal from an oscillator in the phase locked loop.

33. An apparatus comprising:

an input to receive a stream of incoming data signals;

an amplifier to amplify the incoming data signals;

a timing acquisition circuit including a phase detector and a sampling circuit, the timing acquisition circuit coupled to an output of the amplifier to extract clock information from the amplified incoming data signals and to provide re-timed signals corresponding to the incoming data signals based on the extracted clock information; and circuitry coupled between an output of the timing acquisition circuit and an input of the amplifier to adjust the slice level of the sampling circuit based on a transition bit in the stream.

34. The apparatus of claim 33 wherein said circuitry includes a digital low-pass filter.

35. The apparatus of claim 33 wherein said circuitry is configured to provide signals indicative of how to adjust the slice level based on respective states of transition bits occurring between pairs of consecutive re-timed data bits.

36. The apparatus of claim 35 wherein said circuitry includes a counter to average the signals indicative of how to adjust the slice level.

37. The apparatus of claim 36 wherein the counters generate a signal indicating that the slice level should be adjusted if one of the counters reaches a predetermined count.

38. The apparatus of claim 33 wherein said circuitry includes a charge pump.

39. The apparatus of claim 33 wherein said circuitry includes a continuous-time low-pass filter.

40. The apparatus of claim 33 wherein said circuitry includes a sampled data filter.

41. An apparatus comprising:

an input to receive a stream of incoming data signals;

a timing acquisition circuit coupled to said input and including a sampling circuit to sample the incoming data signals, said timing acquisition circuit to extract clock information from the incoming data signals and to provide re-timed signals corresponding to the incoming data signals based on the extracted clock information; and a feedback loop coupled between an output of the timing acquisition circuit and said input to adjust a slice level of the sampling circuit based on a transition bit sampled from the stream.

42. The apparatus of claim 41 wherein the feedback loop includes a digital low-pass filter.

43. The apparatus of claim 42 wherein the feedback loop includes a digital-to-analog converter coupled to an output of the low-pass filter.

44. The apparatus of claim 41 wherein the feedback loop includes a charge pump.

45. The apparatus of claim 44 wherein the feedback loop includes a loop filter coupled to an output of the charge pump.

46. The apparatus of claim 41 wherein the feedback loop includes a continuous-time low-pass filter.

47. The apparatus of claim 41 wherein the feedback loop includes a sampled data filter.

* * * * *